United States Patent [19]

Moracz et al.

[11] Patent Number: 5,072,871

[45] Date of Patent: Dec. 17, 1991

[54] METHOD OF MAKING HOLLOW ARTICLES

[75] Inventors: Donald J. Moracz, Garfield Heights; Roch J. Shipley, Mentor, both of Ohio

[73] Assignee: Compressor Components Textron Inc., Lima, Ohio

[21] Appl. No.: 543,967

[22] Filed: Jun. 27, 1990

[51] Int. Cl.⁵ .................. B23K 20/00; B21K 3/04
[52] U.S. Cl. .................... 228/193; 228/236; 228/237; 29/889.72
[58] Field of Search ............. 228/233, 236, 237, 193, 228/181, 243; 29/889.7, 889.72

[56] References Cited

U.S. PATENT DOCUMENTS

| | | | |
|---|---|---|---|
| 2,807,437 | 9/1957 | Roush | 253/77 |
| 3,628,226 | 12/1971 | Nelson | 29/156.8 H |
| 3,736,638 | 6/1973 | Stone, Jr. | 29/156.8 |
| 3,787,959 | 1/1974 | Moore et al. | 29/482 |
| 4,087,037 | 5/1978 | Schier et al. | 228/106 |
| 4,089,456 | 5/1978 | Toppen et al. | 228/195 |
| 4,181,000 | 1/1980 | Hamilton et al. | 72/60 |
| 4,220,276 | 8/1980 | Weisert et al. | 228/118 |
| 4,233,829 | 11/1980 | Hamilton et al. | 72/38 |
| 4,233,831 | 11/1980 | Hamilton et al. | 72/60 |
| 4,294,419 | 10/1981 | Fouse et al. | 244/177 |
| 4,304,821 | 12/1981 | Hayase et al. | 428/593 |
| 4,331,284 | 5/1982 | Schulz et al. | 228/157 |
| 4,354,369 | 10/1982 | Hamilton | 72/38 |
| 4,603,808 | 8/1986 | Stacher | 228/265 |
| 4,606,778 | 8/1986 | Jahnke | 148/11.5 N |
| 4,611,752 | 9/1986 | Jahnke | 228/194 |
| 4,642,863 | 2/1987 | Schulz | 29/156.8 B |
| 4,811,890 | 3/1989 | Dowling et al. | 228/193 |
| 4,817,858 | 4/1989 | Verpoort | 228/236 |

Primary Examiner—Samuel M. Heinrich
Attorney, Agent, or Firm—Reising, Ethington, Barnard, Perry & Milton

[57] ABSTRACT

A method for making a hollow article, for example, a hollow airfoil, from first and second preformed sections involves first forming a precursor fluid impermeable (seal) diffusion bond between opposing bonding surfaces. The precursor bond is formed by subjecting the assembled sections to coordinated pressure-time-temperature conditions where a first high external pressure is applied to reduce any gaps between the opposing bonding surfaces and then a second lower external pressure is applied to actually form the precursor diffusion bond with only limited distortion of one of the sections and no distortion of the other section. In a second step of the method, the precursor bonded sections are subjected to coordinated pressure-time-temperature conditions where a high external and high internal pressure are utilized to form a complete patent metal diffusion bond between the bonding surfaces without distortion of either section. An inflation step may be conducted concurrently or subsequently to the second diffusion bonding step where, during the inflation step, a high external and high internal pressure are utilized to remove any limited distortion of the affected section.

21 Claims, 4 Drawing Sheets

METHOD OF MAKING HOLLOW ARTICLES

Field Of the Invention

The present invention relates to a method of making a hollow article and, in particular, to a method of making a hollow airfoil, by diffusion bonding separate preformed sections, such as blade halves.

BACKGROUND OF THE INVENTION

Copending U.S. patent application Ser. No. 07/544,415 entitled "Method Of Making Hollow Articles" of common assignee herewith describes a method of making a hollow article, for example, a hollow airfoil, by diffusion bonding first and second preformed sections (e.g., airfoil halves). The method involves initially forming a substantially fluid impermeable precursor diffusion bond (i.e., a gas seal bond) between opposing bonding surfaces of the first and second sections with only limited distortion of one of the sections and no distortion of the other section. In particular, in the initial precursor bonding step, the assembled sections are subjected to coordinated pressure-temperature-time conditions where a relatively low first external pressure (e.g. about 50-100 psi) is so applied to the first section with a cavity between the sections evacuated as to form a substantially fluid impermeable precursor or seal bond between the bonding surfaces During this step, an intermediate wall of the first section undergoes some inward distortion as a result of the negative pressure differential applied thereacross. Preferably, the extent of such inward distortion is controlled or limited to an amount which is removable by subsequent inflation of the intermediate wall. Preferably, distortion is limited by applying a relatively low external pressure (e.g., 50-100 psi) on the first section. If the airfoil design permits, the inward distortion of the intermediate wall is limited to prevent the intermediate wall from contacting the intermediate wall of the second section, thereby eliminating the need for a release agent on the intermediate walls. Distortion of the intermediate wall of the second section is prevented by subjecting both the cavity and the exterior of the second section to a relative vacuum while supporting the second section on a rigid die or shaping surface.

The first and second precursor or seal bonded sections are then subjected to coordinated pressure-temperature-time conditions where a relatively high external pressure of greater magnitude (e.g, 300-600 psi) than that applied to effect the precursor bond is applied to the second section and an internal fluid pressure of substantially the same magnitude (e.g., 300-600 psi) as the second external pressure is applied to the cavity while the intermediate wall of the first section is cooperatively positioned relative to a rigid shaping surface. The internal pressure in the cavity causes the intermediate wall of the first section to conform to the shaping surface to remove any distortion resulting from the previous seal bonding step. The external pressure on the second section, in turn, effects complete diffusion bonding between the bonding surfaces and prevents distortion of the intermediate wall of the second section.

Alternately, the diffusion bonding step and inflation steps of the method can be practiced separately. For example, the first and second precursor bonded sections are subjected to coordinated pressure-temperature-time conditions where the aforementioned relatively high second external pressure is so applied to the first section and an internal pressure of substantially the same magnitude is so applied to the cavity as to diffusion bond the bonding surfaces without further inward distortion of the intermediate wall of the first section During this high pressure diffusion bonding step, distortion of the intermediate wall of the second section is prevented by supporting it on a rigid die or shaping surface. After diffusion bonding, the sections are then subjected to a separate inflation step where a relatively high internal pressure (e.g, 300-600 psi) is applied to the cavity with the intermediate wall of the first section cooperatively positioned relative to another rigid die or shaping surface. The internal pressure is applied at a level (e.g., 300-600 psi) to cause the intermediate wall of the first section to conform to the rigid shaping surface to remove distortion. Distortion of the intermediate wall of the second section is prevented by applying external pressure thereon of substantially the same magnitude as the internal pressure applied in the cavity between the sections.

It is an object of the invention to provide a method of making a hollow article, such as a hollow airfoil, from preformed sections in accordance with the method described hereinabove wherein the external pressure is varied in such a way during the precursor seal bonding operation as to enhance contact between the opposing bonding surfaces It is another object of the invention to provide a method of making a hollow article, such as a hollow airfoil, where, during the operation to form the precursor or seal bond, the external pressure is varied in such a way as to prevent deleterious distortion of the sections while enhancing contact between the opposing bonding surfaces.

SUMMARY OF THE INVENTION

The present invention contemplates a method of making a hollow article from first and second preformed metallic sections wherein the first and second sections are assembled in such a manner that bonding surfaces thereon are opposing and a cavity is formed between intermediate walls of the sections. The assembled sections are subjected first to coordinated pressure-temperature-time conditions to form the substantially fluid impermeable precursor diffusion bond where (1) a first external pressure is so applied to the first section with the cavity evacuated as to reduce any gaps between the opposing bonding surfaces and thereby enhance contact therebetween and then (2) a second external pressure less than the first pressure is so applied as to form the precursor bond. The first external pressure applied is relatively high (e.g., 300-600 psi) so as to insure that the opposing bonding surfaces are brought into contact. During this initial step, the intermediate wall of the first section undergoes some inward distortion as a result of the negative pressure differential established thereacross. Preferably, the extent of such inward distortion is controlled or limited by limiting the time at the higher first external pressure and by limiting the magnitude of the second external pressure applied to effect the actual precursor diffusion bond. Distortion of the intermediate wall of the first section is preferably limited to a minor amount that is removable by the subsequent inflation step. Distortion of the intermediate wall of the second section is prevented by subjecting both the cavity and the exterior of the second section to a relative vacuum while supporting the second section on a rigid die or shaping surface.

After the precursor or seal bond is formed, the first and second sections are then subjected to coordinated pressure-temperature-time conditions to form a parent metal type diffusion bond between the bonding surfaces that is adequate for the actual service conditions the final bonded article is to encounter. The diffusion bonding step can be conducted concurrently with an inflation step adapted to remove any distortion of the intermediate wall of the first section or separately prior to the inflation.

The method of the present invention is especially useful, although not limited to, forming a hollow airfoil, such as a hollow gas turbine engine fan blade, from preformed airfoil halves which may be forged, cast, machined or otherwise formed. The method of the invention is capable of making hollow airfoils to strict tolerances required since distortion of one airfoil half is prevented altogether while distortion of the other half is controlled or limited in the seal bonding step and diffusion bonding step and is subsequently removed by inflation against a precision rigid die surface.

These and other objects and advantages of the present invention will become more readily apparent from the detailed description and drawings which follow.

DETAILED DESCRIPTION OF THE INVENTION

The present invention is illustrated in detail hereinbelow with respect to the fabrication of a hollow gas turbine engine fan blade constituting one of the preferred embodiments of the invention. However, illustration of the invention in this manner is not to be construed as limiting the scope and applicability of the present invention which has wider applicability to other products. For example, the invention is also applicable to and useful for the manufacture of other gas turbine engine parts and airframe parts, high performance static and dynamic engineering structures, and surface and underwater marine devices and ordnance.

In accordance with the present invention, the desired hollow article is to be formed from two or more preformed metallic sections, bondable together at a parting or bonding plane, such that the internal features forming the hollow portion of the article are initially exposed for inspection and repair/reconfiguring, if necessary, prior to bonding. In particular, in the case of a hollow gas turbine engine fan blade, the blade is formed from first and second preformed blade half sections 10,12, FIG. 1, bondable at a parting or bonding planes "P" therebetween oriented along the precise or approximate mean camber surface, which is a blade datum reference plane well known in the art. The precise location of the parting or bonding planes will be dependent upon the internal cavity designs(s), service stress field distributions, and/or convenience for the preform fabrication operation.

Figure 1:
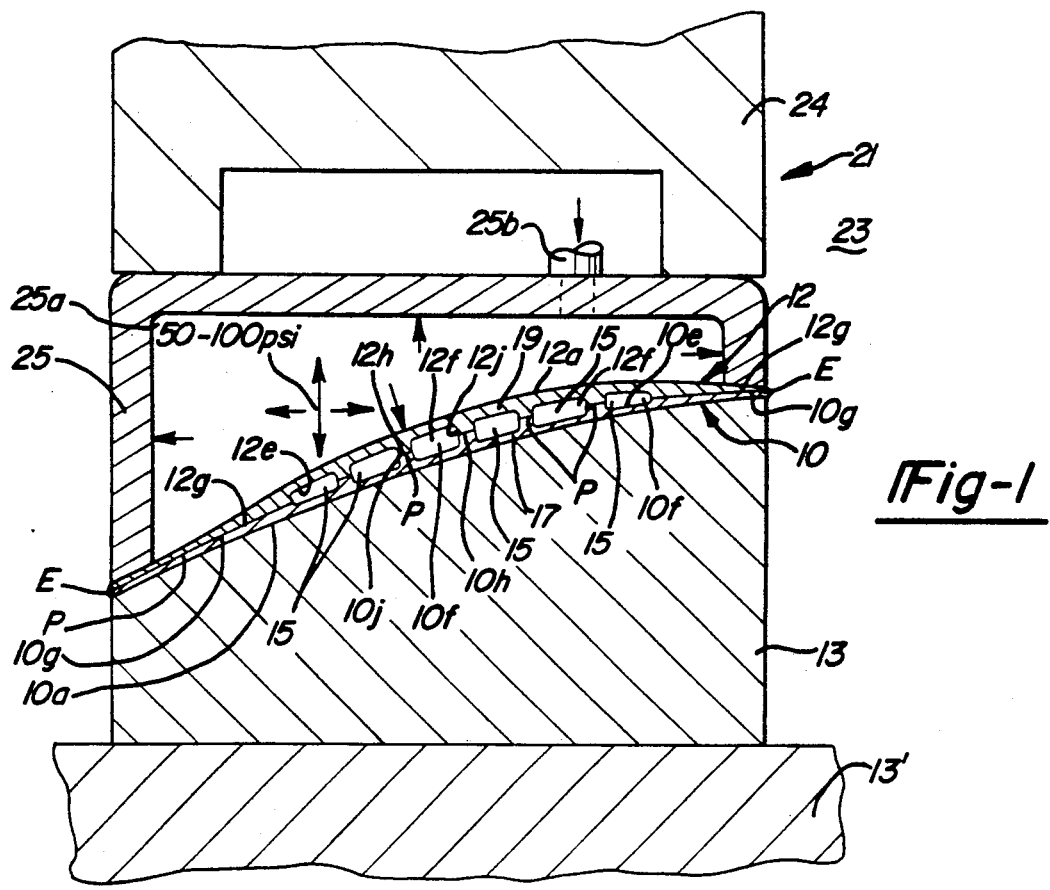
FIG. 1 is a cross-sectional view of concave and convex airfoil sections positioned on a die of a vacuum press for practicing the invention.
Figure 9:
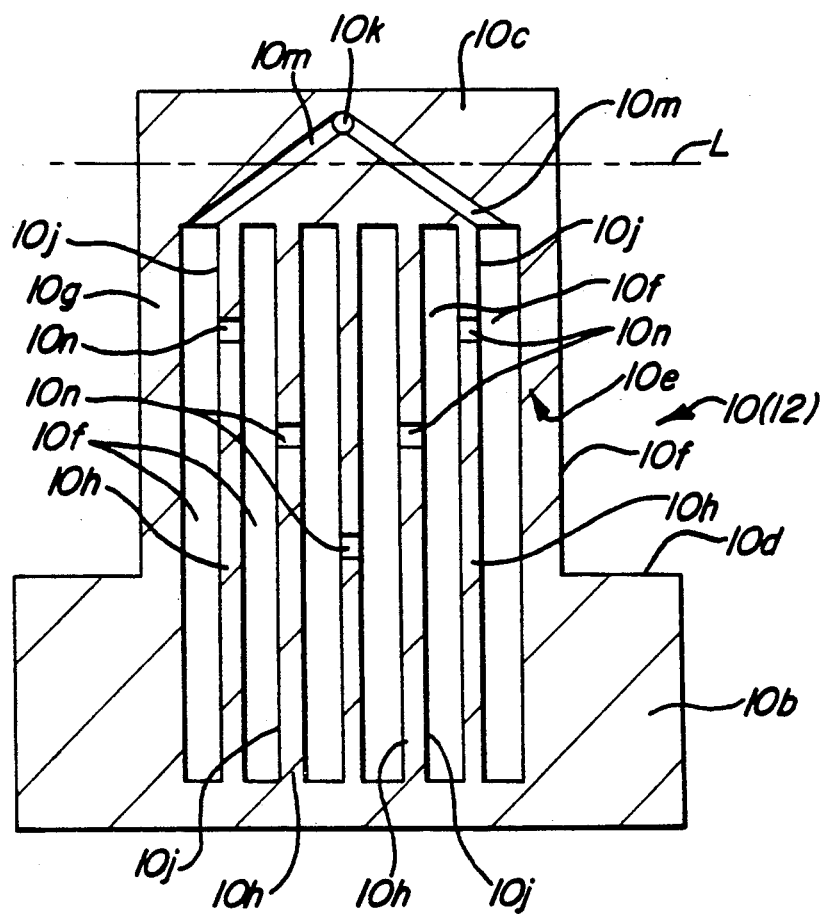
FIG. 9 is an elevational view of the inner side of one of the airfoil sections showing the gas passages formed therein for delivering gas pressure to the cavities of the airfoil. The inner side of the other airfoil section is generally the same in configuration.

Referring to FIG. 1, each preformed blade section 10,12 is illustrated as including a first, outer, partial airfoil-shaped side 10a (concave side),12a (convex side) and a second inner side 10e,12e, respectively. The sides 10a,12a; 10e,12e are disposed between root-shaped portions (only root portion 10b shown for blade section 10, FIG. 9) and tip portions (only tip portion 10c shown for blade 10, FIG. 9) of each blade. Each root-shaped portion may include an optional laterally extending partial platform portion (only platform portion 10d shown, FIG. 9) depending upon the particular blade design to be manufactured.

The second, inner sides 10e,12e each include a plurality of longitudinally extending (i.e., extending from the root-shaped portion toward the respective tip) cavities 10f,12f separated and bounded by spaced apart peripheral bonding surfaces 10g,12g and inboard bonding surfaces 10h,12h disposed on raised support ribs 10j,12j in the desired bonding plane. As mentioned hereinabove, the bonding surfaces 10g,12g and 10h,12h may be oriented substantially on the mean chamber surface of the blade to be formed.

In FIG. 1, the first and second blade sections 10,12 are shown assembled and positioned on a first rigid die 13 with the peripheral bonding surfaces 10g,12g abutting and with cavities 15 formed by cooperating cavities 10f,12f between intermediate walls 17,19. Rigid die 13 is supported on rigid support member 13'. Intermediate walls 17,19 extend between the peripheral bonding surfaces 10g,12g. The support ribs 10j,12j and respective intermediate walls 17,19 are integrally formed. The inboard bonding surfaces 10h of the blade section 10 are in abutting relation to inboard bonding surfaces 12h on blade section 12.

The inner sides 10e,12e of each blade section 10,12 are directly accessible prior to assembly for observation and inspection of the cavities 10f,12f and bonding surfaces 10g,12g; 10h,12h for dimensional accuracy, structural integrity, metallurgical quality, etc.

The blade sections 10,12 are produced from appropriate metals/alloys by appropriate precision fabrication operations. These operations can include, but are not limited to, forging and forming, machining, net P/M (powder metallurgy) techniques, or others. The precision forging process is the preferred method for titanium alloys used in hollow aircraft engine fan blades and will be incorporated hereafter in the example of the invention. Although simple rectangular cavities 10f,12f are illustrated in the drawings, other cavity designs can be similarly provided. Virtually any internal cavity geometry can be accommodated by the method of the invention and the cavity shape shown is not to be construed as being the sole embodiment of the method of the invention or the only cavity design option available.

The resultant blade sections 10,12 can be easily inspected to accurately verify the geometry of the internal cavities 10f,12f at this point of the manufacturing sequence. The post-forge inspections are performed following removal of forge process aids, such as lubricants, coatings, and possible reaction zones.

In the event of the presence of geometric or metallurgical imperfections or defects on the bondable blade sections 10,12, especially on the inner sides 10e,12e, corrective action can be taken prior to joining the blade halves 10,12 together. Such corrective action can include rework, cavity refinement, and feedback to the forge process to minimize or eliminate future deviations. Also, the critical cavity geometry verification operation can be performed prior to accumulation of significant added value to the product. This is a major advantage over existing art in which the cavity 10f,12f can only be examined after most of the value has been added to the product.

It is further noted that attachment details; e.g., the root-shaped portions (root portion 10b and tip portion 10c in FIG. 9) of the blade sections 10,12 or other external details, are forged integrally to the blade halves 10,12. This eliminates the need to separately attach such details to the blade halves 10,12 and thus concerns over the integrity of joints where the details would be attached. The process provides for incorporating the attachment details integral with the preforms, eliminating the cost and/or concerns for attaching separate attachment details, common for many existing prior art methods. Further, the attachment details are provided in a near-net form for either straight or arcuate root forms or to provide a controlled mass for subsequent bonding of the airfoil to a hub structure.

Once the geometry of internal cavities 10f,12f has been fully developed by a precision machining operation and also verified by direct inspection prior to assembly, no further permanent major metal flow or deformation is required by the succeeding steps of the method of the invention. As will become apparent, the succeeding steps assure that the geometry of the internal cavities 10f,12f can be maintained throughout the remainder of the fabrication sequence.

The dimensionally inspected, qualified and assembled blade preform sections 10,12 are now subjected to coordinated pressure-temperature-time conditions to develop a substantially gas impermeable seal or precursor diffusion bond between the bonding surfaces 10g,12g and 10h,12h. This precursor diffusion bond is also referred to as a "sticker" bond and may be characterized by discontinuous porosity between the bonding surfaces as shown in copending application Ser. No. 07/544,415; e.g., in FIGS. 10a and 10b thereof. In any event, as used herein, the precursor bond is intended to mean an incomplete diffusion bond (i.e., not a complete parent metal diffusion bond as is desired in the final manufactured hollow blade) that is inadequate for actual service conditions that the blade is to encounter; e.g., the precursor bond has mechanical properties that are inadequate for the actual service conditions that the blade is to encounter. As will become apparent, the precursor bonds function to resist or prevent gas pressure penetration between the bonding surfaces 10g,12g and 10h,12h during the subsequent high pressure diffusion bonding step to be described and, if any porosity is present in the precursor bonds, to preserve a relative vacuum therein during such high pressure diffusion bonding.

The process sequence of the invention prior to the precursor bonding step (seal bonding step) involves first assembling the blade sections 10,12 (as shown in FIG. 1) and then joining the blade sections 10,12 around the peripheral edges E in a vacuum environment. The objective is to bring the bonding surfaces 10g, 12g; 10h,12h into reasonable approximation of opposing or abutting relation prior to positioning on the die 13. Allowance for the joining operation is provided around the periphery of the blade halves 10,12 such that the region containing the sealing joint or edge E is outside the finished blade envelope and cannot compromise the physical or mechanical condition thereof.

The edge joining of the blade sections 10,12 can be accomplished by a variety of means, the preferred practice being electron beam welding in a vacuum (e.g., $10^{-5}$ mm of Hg). Other known joining techniques can be used. Another objective of edge joining is to provide a relative vacuum (e.g., $10^{-5}$ mm of Hg) in the cavities 15 formed between the intermediate walls 17,19 to facilitate bonding of the bonding surfaces 10g,12g and 10h,12h. This edge joining operation provides a sealed, vacuum environment in the cavities 15 between the inner sides 10e,12e to this end.

Figure 2:
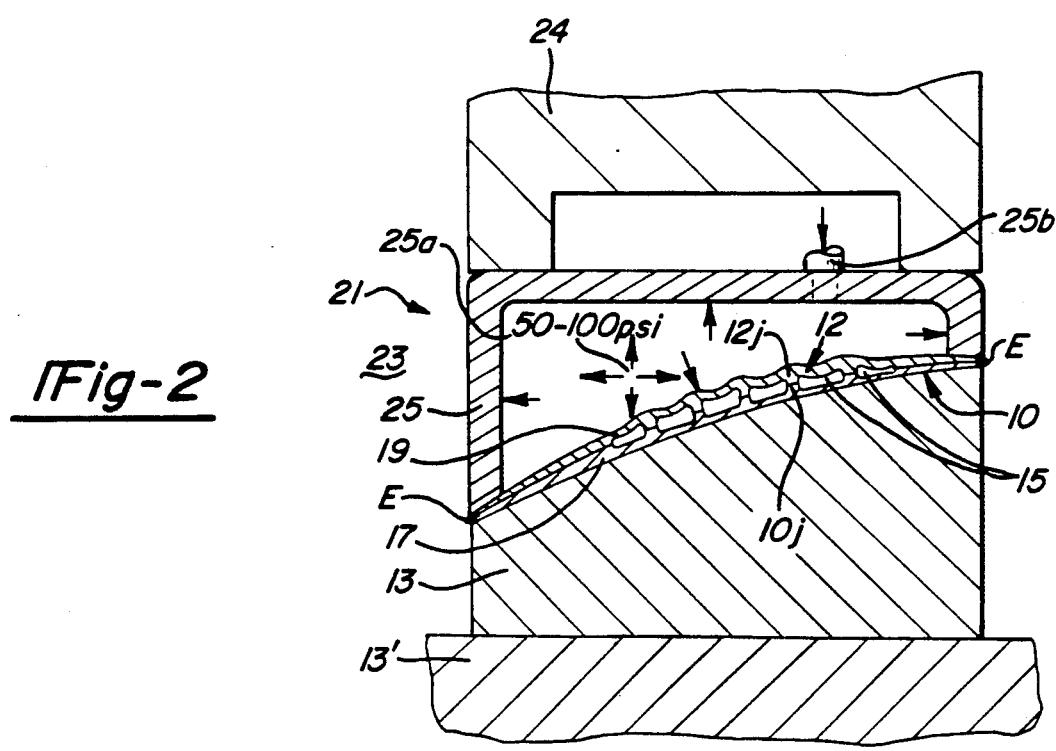
FIG. 2 is similar to FIG. 1 after formation of the precursor or seal diffusion bond between bonding surfaces of the airfoil sections.

Precursor bonding is accomplished by the application of heat and pressure over time to the assembled blade sections 10,12 (with the cavities 15 evacuated as a result of the edge sealing operation described above) in a vacuum press 21 shown schematically in FIGS. 1 and 2. The pressure is varied over time to achieve the aforementioned objects and advantages of the invention. The vacuum press comprises a vacuum chamber 23 of a furnace (not shown), a heat resistant press member 24 and a gas pressure (fluid pressure) manifold 25 to apply fluid pressure to the outer airfoil-shaped side 12a while the outer, airfoil-shaped side 10a is supported by the complementarily-shaped, rigid, heat resistant die 13 in the vacuum chamber 23 of the furnace. As mentioned above, the rigid die 13 is itself supported on rigid support 13'. The press member 24 sealingly engages manifold 25 to the side 10a adjacent the edges E. The manifold 25 includes a chamber 25a which is gas (argon) pressurized from an external source (not shown) through one or more inlets 25b (one shown) to apply bonding pressure to the blade sections 10,12.

In developing the initial precursor or seal bond between bonding surfaces 10g,12g; 10h,12h, a relatively high first external fluid (gas) pressure (see arrows) is initially applied in chamber 25a and thus on wall 19 in coordination with elevated temperature and time at temperature sufficient to so urge the bonding surfaces 10g,12g,; 10h,12h toward one another as to reduce any gaps therebetween and provide adequate contact for developing the precursor bond. The time at the relatively high external pressure (e.g., 300–600 psi) for a given temperature is controlled so as to achieve the desired gap reduction and intimate contact between the bonding surfaces 10g,12g; 10h,12h and yet prevent excessive inward distortion or collapse of the intermediate wall 19 into cavities 15 which, as mentioned, are evacuated; i.e., maintained under a relative vacuum (e.g., $10^{-5}$ mm of Hg as a result of the edge sealing operation described above). The enhanced contact between the bonding surfaces 10g,12g; 10h,12h provided by the initial application of the high pressure to the intermediate wall 19 prior to application of the lower sealing bond pressure facilitates formation of the precursor diffusion bond.

After the selected time at high pressure and temperature, the pressure in chamber 25a is lowered to a relatively low second external pressure (e.g., 50-100 psi) sufficient over time at temperature to form the desired precursor or seal bond between the bonding surfaces 10g,12g; 10h,12h without development of excessive inward distortion of the intermediate wall 19. Typically, the second external pressure will be substantially less, such as up to 10 times less (e.g 1/6 to 1/10) than the higher first external pressure employed initially for gap reduction purposes. Typically, the temperature of the sections 10,12 is maintained the same throughout the first step (i.e., as the first external pressure and the second lower external pressure are applied), although different temperatures may be employed.

In effect, the pressure-temperature-time conditions of the initial precursor bond step are coordinated to limit inward collapse or distortion of the intermediate wall 19 into the cavities 15 which, as mentioned, are maintained under a vacuum (e.g., $10^{-5}$ mm of Hg as a result of the edge sealing operation described hereinabove). In particular, inward distortion is preferably restricted to a minor amount that is removable by a subsequent inflation step. If the design of the airfoil permits, the inward distortion of wall 19 is limited so as to prevent any contact between the intermediate wall 19 and the intermediate wall 17, thereby eliminating any need for a stop-off or release agent in the cavities 10f,12f. When the design of the airfoil makes elimination of contact between the intermediate walls 17,19 impossible, a stop-off or release agent is used on one or both of the walls 17,19 and remains in the final bonded hollow airfoil. Inward distortion of the intermediate wall 17 of the blade section 10 is substantially prevented by subjecting the exterior of wall 17 and the die 13 to a relative vacuum (e.g., $10^{-4}$ mm of Hg) maintained in the vacuum chamber 23. In effect, there is insufficient differential pressure between the cavities 15 and the exterior of intermediate wall 17 to cause distortion of wall 17 under these bonding conditions. Distortion of the blade section 10 from the external gas pressure on the blade section 12 is prevented by the support provided by die 13. The gas seal bonded sections 10,12 are shown in FIG. 2.

For purposes of illustration only, when the blade sections 10,12 are made of the well known Ti-8Al-1Mo-1V alloy, an initial gas (argon) pressure in the manifold chamber 25a of about 300-600 psi, in particular about 600 psi, is employed with a temperature of about 1750° F. of the sections 10,12 for a limited time of about 10 minutes to reduce any gaps between the bonding surfaces 10g,12g; 10h,12h and enhance contact therebetween. Then, for subsequent low pressure precursor bonding, the gas pressure in chamber 25a is lowered to about 50-100 psi, in particular 100 psi, at the same temperature for about 120 minutes to develop the desired precursor or seal bonds between bonding surfaces 10g,12g; 10h,12h.

However, other combinations of pressure, temperature and time can be used within the scope of the invention depending upon the material from which the sections 10,12 are made their geometry (e.g., thickness) and other parameters. The important feature being initially applying the relatively high pressure for a time at temperature sufficient to enhance contact between the bonding surfaces 10g,12g; 10h,12h but insufficient to cause excessive inward distortion or collapse of the intermediate wall 19 and then applying the relatively lower pressure for a time at the same or different temperature to form the substantially fluid (gas) impermeable precursor bond.

Advantageous features of the precursor bonding are that distortion of blade section 10 is prevented altogether, that the external pressure in manifold chamber 25a is initially controlled at a high level for a limited time at temperatures to promote intermediate contact between the opposing bonding surfaces 10g,12g; 10h,12h without excessive distortion and then is subsequently lowered to effect formation of the precursor bond. By applying the initial high external pressure followed by lowering the external pressure, sufficient contact between the opposing bonding surfaces 10g,12g; 10h,12h is provided without the need to perfectly initially match the airfoil halves. Moreover, precursor bonding of the opposing bonding surfaces 10g,12g;10h,12h is effected while preventing harmful distortion or collapse of the intermediate wall 19.

Following the first precursor or seal bonding step, the bonding surfaces 10g,12g; 10h,12h are parent metal diffusion bonded in the evacuated chamber 23 of the vacuum press using high manifold fluid pressure to form a complete, non-porous diffusion bond with parent metal properties adequate for the intended service conditions to be encountered. In particular, referring to FIG. 3. to effect such diffusion bonding, the manifold chamber 25a is gas pressurized (argon gas) through inlet 25b from an external source (not shown) to a level (e.g., about 300 psi) generally several times greater than the relatively low gas pressure (e.g., 50-100 psi) used during the first bonding step to form the seal bonds. This provides a high external fluid (gas) pressure on intermediate wall 19. The high external pressure employed may be the same as or different from the high first external fluid pressure used in the first precursor bonding step for gap reduction purposes. Moreover, the cavities 15 are internally gas pressurized (argon gas) to substantially the same level as provided in manifold chamber 25a. Gas pressure is supplied to the cavities 15 through an inlet hole 10k to a gas inlet passages 10m and then to the cavities 15 which are interconnected in gas flow relation via gas openings 10n in the support ribs 10j,12j, FIG. 9. In this way, pressurized gas can be supplied to each cavity 15 from an external source (not shown). The inlet hole 10k is located on a portion of the blade section 10 that would eventually be cut off (see cut line L) or otherwise removed from the finished bonded blade.

Figure 3:
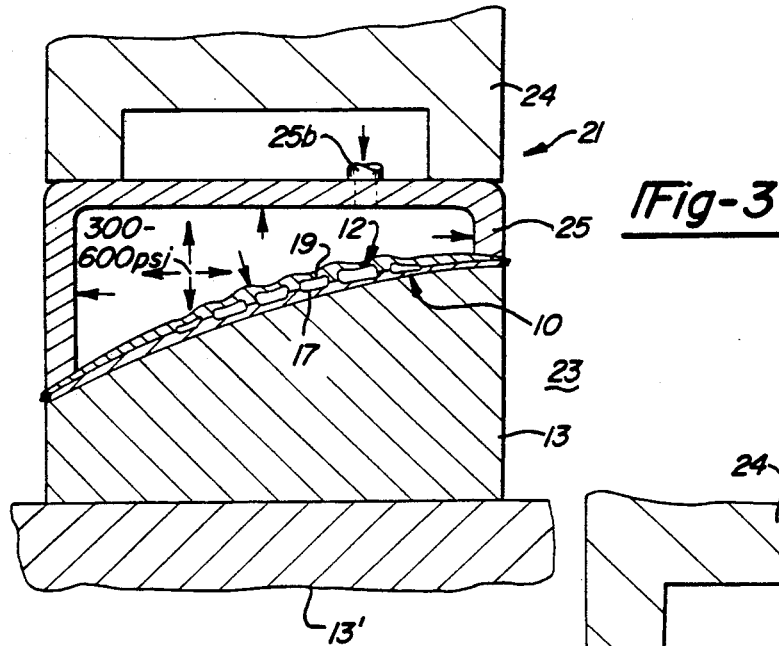
FIG. 3 is similar to FIG. 2 illustrating the diffusion bonding of the bonding surfaces of the airfoil sections by the second high pressure diffusion bonding step of the method of the invention.

Since the gas pressure in the cavities 15 is equal to the external gas pressure on intermediate wall 19 in FIG. 3, further inward distortion of that wall 19 is prevented even though the high gas pressure is present in the manifold chamber 25a for a time necessary to form the parent metal diffusion bond. Outward distortion of wall 17 is prevented by support of die 13.

The temperature, pressure and cycle time of the diffusion bonding step are dependent upon the specific alloy comprising the blade sections 10,12. In the case mentioned above where the blade sections 10,12 are made of Ti-8Al-1Mo-1V alloy, the temperature would be about 1750° F. at an external and internal gas pressure of 300 psi-600 psi for about 120 minutes. Other combinations of these parameters would be utilized depending on mechanical and metallurgical requirements of the alloys and service applications involved. In general, the gas pressure for this diffusion bonding is selected as high as possible without causing significant upset of the support ribs 10h,12h. Some upset of the ribs 10h,12h can be tolerated and can be accommodated for in the original design of the cavities to provide desired cavity geometry Following complete (parent metal) diffusion bonding of the bonding surfaces 10g,12g and 10h,12h during the second diffusion bonding step, the inward distortion of the intermediate wall 19 is removed by a subsequent inflation step. This (the inflation step) is accomplished in a vacuum press by applying internal fluid (argon gas) pressure to the cavities 15 while the diffusion bonded sections 10,12 are positioned on a heat resistant die 33, FIGS. 4 and 5.

Figure 4:
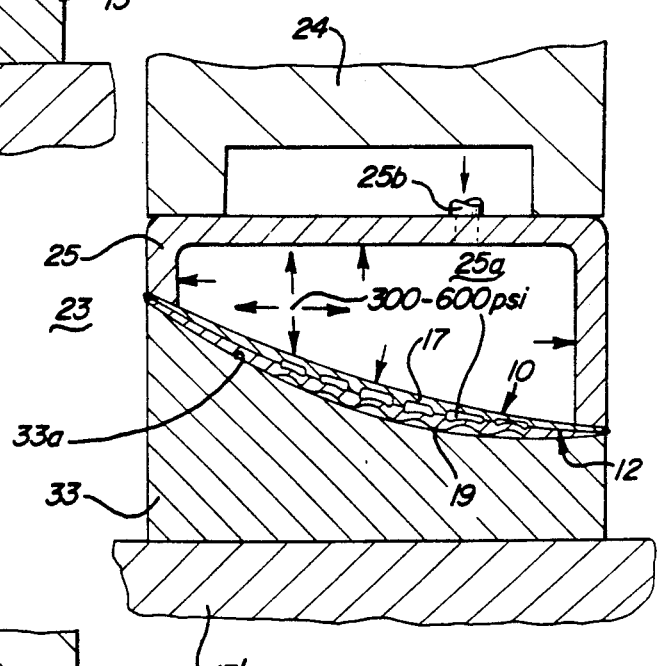
FIG. 4 is similar to FIG. 1 with the diffusion bonded hollow airfoil inverted on a second die of the vacuum press in preparation for inflation of the distorted airfoil wall.
Figure 5:
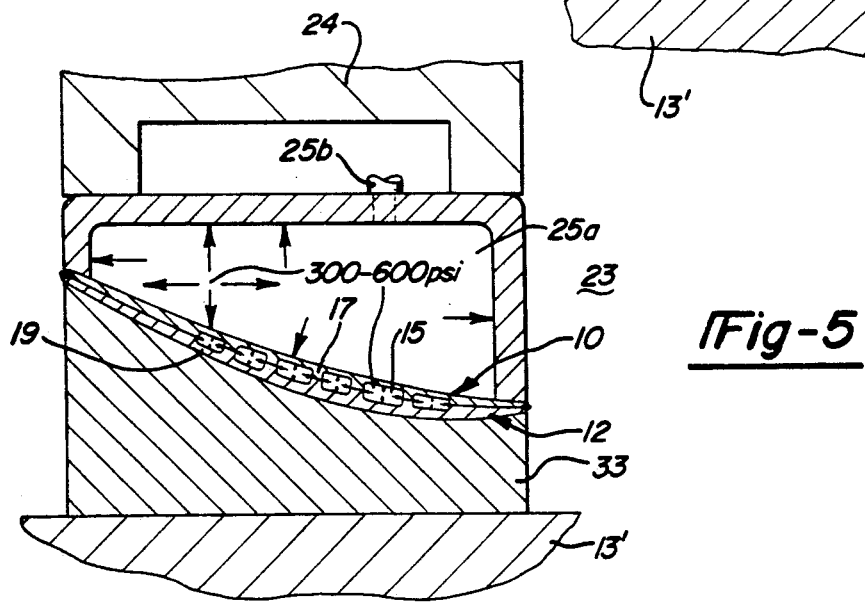
FIG. 5 is similar to FIG. 4 after the third inflation step of the method to conform the distorted airfoil to the second die and restore the desired precision contour thereto.

In particular, the distorted intermediate wall 19 of the blade section 12 is cooperatively positioned on the heat resistant die 33 having a surface 33a configured identically to that desired on the finished blade (corresponding to the original precision outer configuration of the intermediate wall 19). The exterior of the distorted intermediate wall 19 is typically exposed to the relative vacuum (e.g., $10^{-4}$ mm of Hg) in the vacuum chamber 23 surrounding the die 33 although the invention is not so limited so long as an adequate position differential pressure exists across wall 19 to shape it to the die surface. Typically, the blade sections 10,12 are allowed to cool to ambient temperature after second diffusion bonding step and then reheated and positioned on the die 33 as shown in FIGS. 4–5.

During the inflation step, the manifold chamber 25a and cavities 15 are gas (argon) pressurized to generally the same level or magnitude as used in the second diffusion bonding step (e.g., 300 psi-600 psi for Ti-8Al-1Mo-1V blade sections 10,12) and subjected to the same or similar temperature and time parameters employed during the second step. As a result of the high gas pressure in the cavities 15 and the relative vacuum on the exterior of the distorted intermediate wall 19, the intermediate wall 19 is forced and shaped outwardly against the external shaping surface 33a of die 33 to conform to it and remove the distortion from the precursor bonding step and restore the intermediate wall 19 to its original precision contour, FIG. 5. The high gas pressure in the manifold chamber 25 counterbalances that in the cavities 15 to prevent distortion of the intermediate wall 17 of blade section 10.

Removal of the diffusion bonded blade sections 10,12 from the vacuum press 21 after restoration of intermediate wall 19 completes the method of the invention. Cleaning, trimming and final finishing of the external surfaces of diffusion bonded blade sections 10,12 would follow practices well established by those skilled in the art of airfoil manufacture.

Although the seal bonding, parent metal diffusion bonding and inflation steps are described hereinabove as being practiced when the vacuum chamber 23 is evacuated (e.g., $10^{-4}$ mm of Hg), it is within the scope of the invention to provide ambient (air), inert or other atmospheres in the chamber 23 during conduct of one or more of these operations. Moreover, these operations may be carried out using a series of presses 21, each press being used to perform one of the operations in succession on the sections 10,12. The sections 10,12 may be preheated prior to positioning in each press.

Specific advantages of the diffusion bonding and inflating steps are as follows:

(a) Diffusion bonding pressures are always normal to the bonding surfaces 10g,12g and 10h,12h.

(b) The diffusion bonding process is not limited by die or preform geometries or tolerances, or the lack thereof.

(c) There does not need to be a perfect initial match between the bonding surfaces of the airfoil halves because the initial high pressure at temperature will bring the halves (bonding surfaces) together in substantial contact.

(d) Any preform geometry, such as large fan blades or other complex design structures can be accommodated.

(e) The precision of the blade section 10 is not compromised by any significant metal deformation during the precursor or seal bonding, diffusion bonding or inflation steps.

(f) A high diffusion bonding pressure during the diffusion bonding step after the precursor or seal bonding step can be used without further distorting the intermediate wall 19 of the blade section 12.

(g) The inflation operation (pressurizing cavities 15) restores the precise external contour of the intermediate wall 19 of the blade section 12.

(h) No superplastic behavior is required for any of the features of the blade sections 10,12, thus allowing virtually any alloy having adequate workability to be used.

(i) Initial properties of the materials comprising the blade sections 10,12 are preserved, i.e., mechanical properties are not degraded or reduced.

(j) Post-diffusion bond verification of the resultant bond integrity is easily facilitated as the bond plane is readily accessible and easily defined.

(k) The final desired blade geometry is assured.

(l) The use of internal stop-off materials or release agents between the blade sections 10,12 may be eliminated as permitted by the airfoil design.

Figure 6:
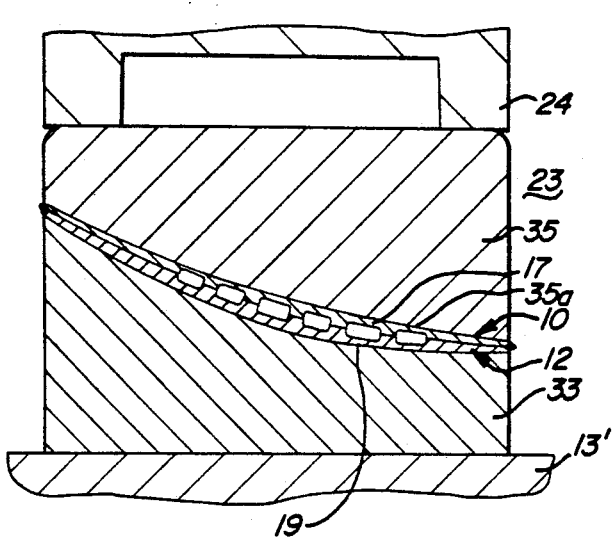
FIG. 6 is a cross-sectional view of another embodiment of the invention where a rigid die is substituted in the vacuum press for the manifold of FIG. 1.

A variation of the inflation step described hereinabove is illustrated in FIG. 6 where a heat resistant die 35 is substituted for the manifold 25. The complementary contoured surface 35a of the die 35 is pressed via press member 24 against the intermediate wall 17 to counter the internal pressure in cavities 15, thereby preventing distortion of the intermediate wall 17 during the inflation operation to restore the precision contour to intermediate wall 19.

Another embodiment of the invention is illustrated by reference to FIGS. 1–2 and FIGS. 7–8 where like reference numerals are used to designate like features of FIGS. 1–2. In accordance with this embodiment, the blade sections 10,12 are assembled and the bonding surfaces 10g,12g and 10h,12h are precursor or "sticker" bonded in the manner described hereinabove for the preceding embodiment and shown in FIGS. 1–2.

Figure 7:
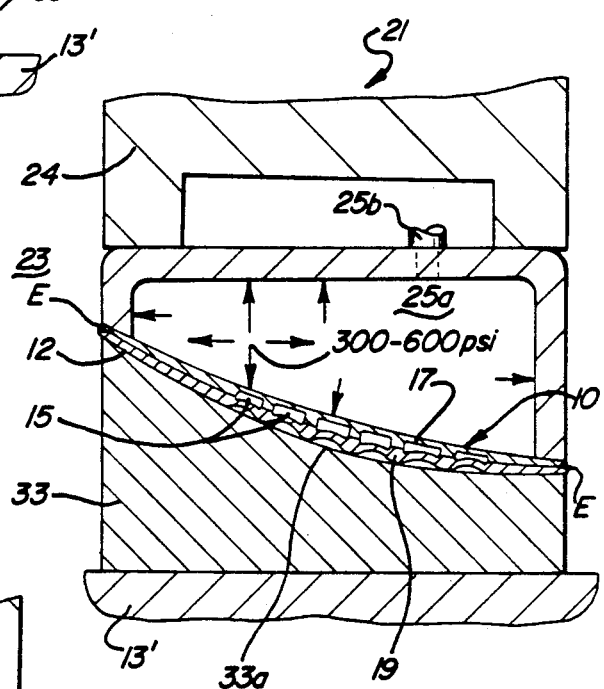
FIG. 7 is a cross-sectional view of the hollow airfoil, after the precursor seal bond is formed, and in accordance with another embodiment of the invention where the precursor bonded airfoil is supported on a rigid die of a vacuum press so as to practice the high pressure diffusion bonding step and inflation step in one step.
Figure 8:
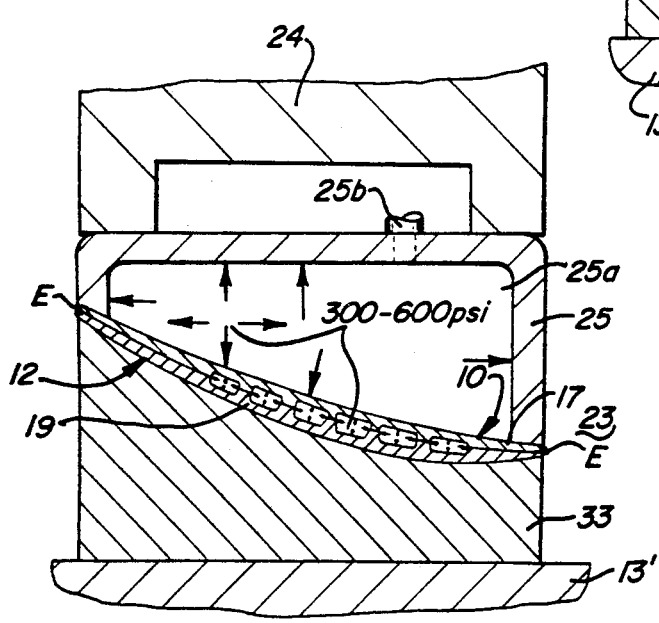
FIG. 8 is similar to FIG. 7 after the high pressure diffusion bonding and inflation step.

However, after the bonding surfaces 10g,12g and 10h,12h are precursor or seal bonded, the blade sections 10,12 are placed on the rigid die 33 in the vacuum chamber 23 with the distorted intermediate wall 19 of the blade section 12 adjacent the rigid, heat resistant die 33, FIG. 7. The manifold 25 is sealingly engaged to the blade section 10 (outer periphery thereof) by press member 24. The exterior of the intermediate wall 19 is subjected to the relative vacuum in the vacuum chamber 23 surrounding the die 33. Concurrently, high fluid pressure (argon gas) is applied to the cavities 15 and to the manifold chamber 25a such that the pressure in the cavities 15 is substantially equal to that in the manifold chamber 25a. This pressure is coordinated with the elevated temperature and time at temperature and pressure to conform the intermediate wall 19 to the shaping surface 33a of the die to remove the distortion (i.e., to restore the intermediate wall 19 to its original precision contour) and also to effect a complete parent metal diffusion bond between the bonding surfaces 10g,12g and 10h,12h. FIG. 8 illustrates the blade sections 10,12 after the combined diffusion bonding and inflation operation.

In this way, the diffusion bonding step and the inflation step (distortion removal step) are combined into one operation, providing improved production economies.

For Ti-8Al-1Mo-1V blade sections 10,12, the pressure-temperature-time conditions for practicing the combined diffusion bonding and inflation step comprise a pressure (in cavities 15 and manifold chamber 25a) of about 300 psi-600 psi a temperature of about 1750° F. and a time of about 120 minutes.

The present invention provides a method to economically fabricate durable, light weight hollow articles and structures for high performance applications. The applications include aircraft and land based turbine engines, other turbomachinery, critical aircraft structural members, and other structures having critical physical and mechanical property requirements.

The method of the present invention includes the following advantages and objects:

(a) Complex hollow parts can be fabricated without adversely affecting the physical or mechanical characteristics of the initial bulk material (e.g., the Ti-8Al-1Mo-1V alloy of blade sections 10,12).

(b) The geometry of the internal passages or cavities 15 is fully controlled as a result of the process sequence employed.

(c) Special material properties, such as superplasticity, are not required to practice this invention.

(d) The process is not limited by inherent preform size or design geometries.

(e) Full parent metal diffusion bonding is assured.

(f) Conventional inspection means can be used to inspect and verify the cavity geometries prior to the joining operations.

Although certain preferred features and embodiments of the invention have been described hereinabove and in the drawings, it is to be understood that modifications and changes may be made therein without departing from the spirit and scope of the invention as defined in the appended claims.

I claim:

1. A method of making a hollow article from first and second preformed sections, each section having spaced apart bonding surfaces and a wall intermediate the bonding surfaces, comprising the steps of:

(a) assembling the first and second sections in such a manner that the bonding surfaces of the sections are opposing and the intermediate walls of the sections define a cavity therebetween, (b) forming a substantially fluid impermeable precursor diffusion bond between the opposing bonding surfaces by subjecting the assembled sections to pressure-temperature-time conditions where (1) a first external pressure is so applied to the first section with the cavity evacuated as to reduce any gaps between the opposing bonding surfaces and (2) a second external pressure less than the first external pressure is so applied to the first section with the cavity evacuated as to form a substantially fluid impermeable precursor diffusion bond between the opposing bonding surfaces, (c) subjecting the sections to pressure-temperature-time conditions where a third external pressure greater than the second external pressure is so applied to the first section and an internal pressure of substantially the same magnitude as said third external pressure is so applied to the cavity as to diffusion bond the bonding surfaces, and (d) subjecting the sections to pressure-temperature-time conditions where an internal pressure is so applied to the cavity with the intermediate wall of the first section positioned relative to a rigid external shaping surface as to shape the intermediate wall to the shaping surface to remove any inward distortion of the intermediate wall resulting from step (b).

2. The method of claim 1 including substantially preventing distortion of the intermediate wall of the second section in steps (b), (c) and (d).

3. The method of claim 1 wherein the first external pressure applied in step (b)(1) and the third external pressure application in step (c) are substantially the same.

4. The method of claim 2 wherein distortion of the intermediate wall of the second section is prevented in step (b) by subjecting the cavity and the exterior of said intermediate wall to a relative vacuum.

5. The method of claim 2 wherein distortion of the intermediate wall of the second section is prevented in steps (b) and (c) by supporting it on a rigid surface.

6. The method of claim 2 wherein distortion of the intermediate wall of the second section is prevented in step (d) by subjecting said intermediate wall to an external pressure substantially the same as said internal pressure.

7. The method of claim 1 wherein the first external pressure applied in step (b) is from about 300 psi to about 600 psi.

8. The method of claim 1 wherein the second external pressure and the internal pressure applied in step (c) is about 300 to about 600 psi.

9. The method of claim 1 wherein the first and second sections are configured as portions of an airfoil.

10. The method of claims 1 or 9 wherein the first and second sections include cooperating bonding surfaces inboard of said spaced apart bonding surfaces and said inboard bonding surfaces are precursor bonded in step (b) and diffusion bonded in step (c) to form a rib between said sections, said rib dividing the cavity.

11. The method of claim 1 wherein the fluid impermeable seal bond formed in step (b) includes disconnected porosity.

12. A method of making a hollow article from first and second preformed sections, each section having spaced apart bonding surfaces and a wall intermediate the bonding surfaces, comprising the steps of:

(a) assembling the first and second sections in such a manner that the bonding surfaces of the sections are opposing and the intermediate walls of the sections define a cavity therebetween, (b) forming a substantially fluid impermeable precursor diffusion bond between the opposing bonding surfaces by subjecting the assembled sections to pressure-temperature-time conditions where (1) a first external pressure is so applied to the first section with the cavity evacuated as to reduce any gaps between the opposing bonding surfaces and then (2) a second external pressure less than the first external pressure is so applied to the first section with the cavity evacuated as to form the precursor diffusion, and (c) subjecting the sections to pressure-temperature-time conditions where a third external pressure of greater magnitude than the second external pressure is applied to the second section and an internal pressure of substantially the same magnitude as the third external pressure is applied to the cavity while the intermediate wall of the first section is positioned relative to a rigid shaping surface such that the intermediate wall of said first section is conformed to said shaping surface to remove any distortion resulting from step (b) and such that the bonding surfaces are diffusion bonded.

13. The method of claim 12 including substantially preventing distortion of the intermediate wall of said second section in steps (b) and (c).

14. The method of claim 12 wherein the first external pressure applied in step (b)(1) and the third external pressure application in step (c) are substantially the same.

15. The method of claim 13 wherein distortion of the intermediate wall of the second section is prevented instep (b) by subjecting the cavity and the exterior of said intermediate wall to a relative vacuum.

16. The method of claim 13 wherein distortion of the intermediate wall of the second section is prevented in step (c) by subjecting said intermediate wall to an external pressure substantially the same as said internal pressure.

17. The method of claim 12 wherein the first external pressure applied in step (b) is about 300 to about 600 psi.

18. The method of claim 12 wherein the second external pressure and the internal pressure applied in step (c) is about 300 to about 600 psi.

19. The method of claim 12 wherein the first and second sections are configured as portions of an airfoil.

20. The method of claims 12 or 19 wherein the first and second sections include cooperating bonding surfaces inboard of cooperating peripheral bonding surfaces and said inboard bonding surfaces are precursor bonded in step (b) and are diffusion bonded together in step (c) to form a rib between said sections, said rib dividing the cavity.

21. The method of claim 12 wherein the fluid impermeable precursor bond formed in step (b) includes disconnected porosity.

* * * * *